May 29, 1923.
H. E. SHREEVE
ENERGIZATION AND CONTROL OF VACUUM TUBES
Filed May 28, 1921   2 Sheets-Sheet 2
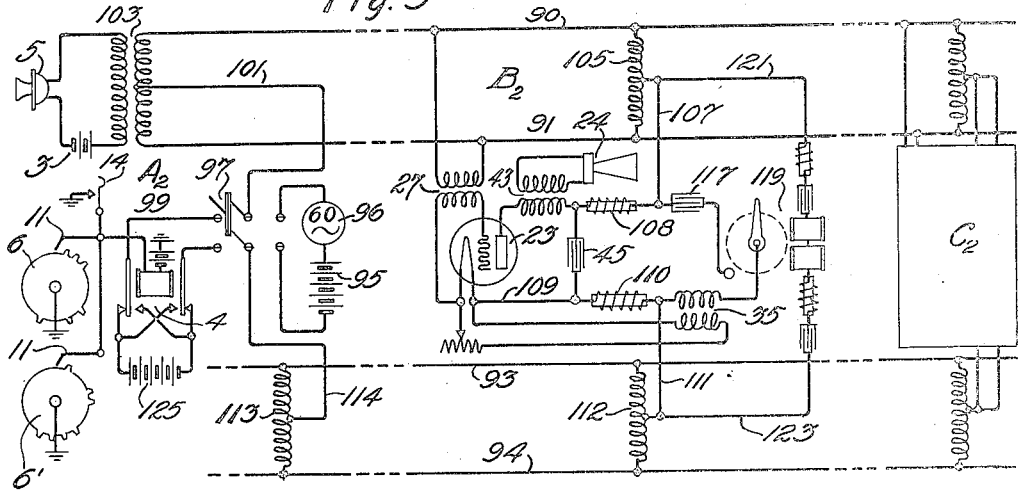
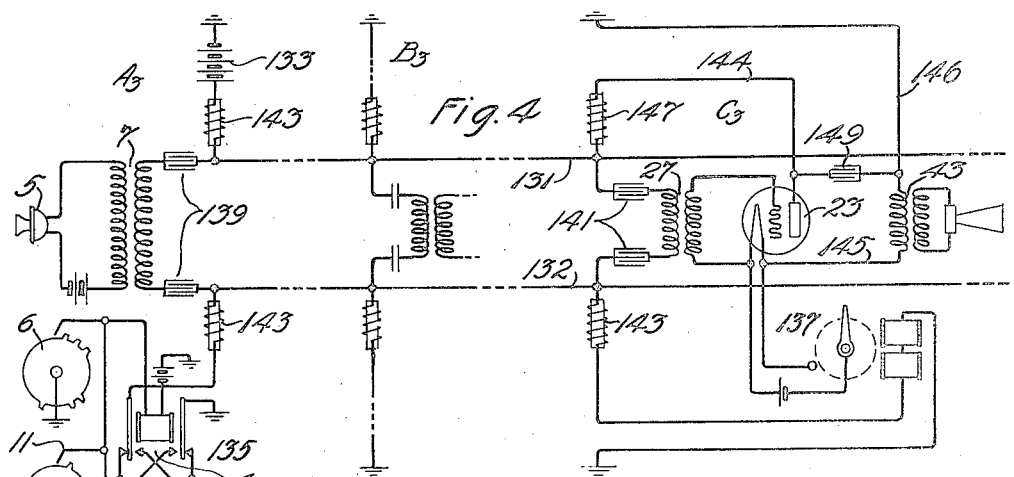
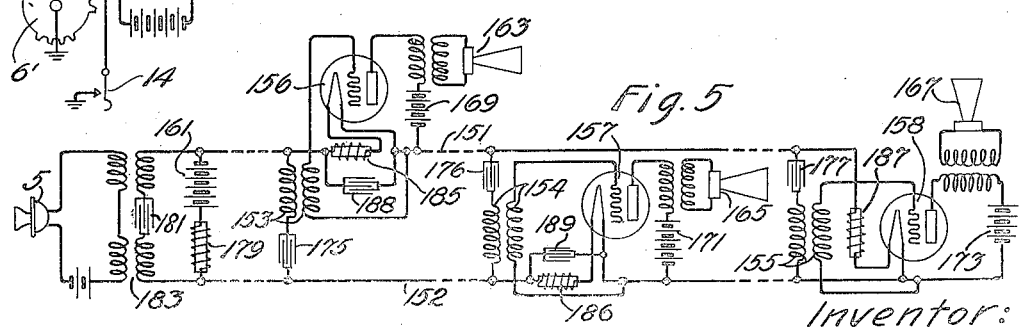
Inventor:
Herbert E. Shreeve
by W. E. Beatty, Att'y.

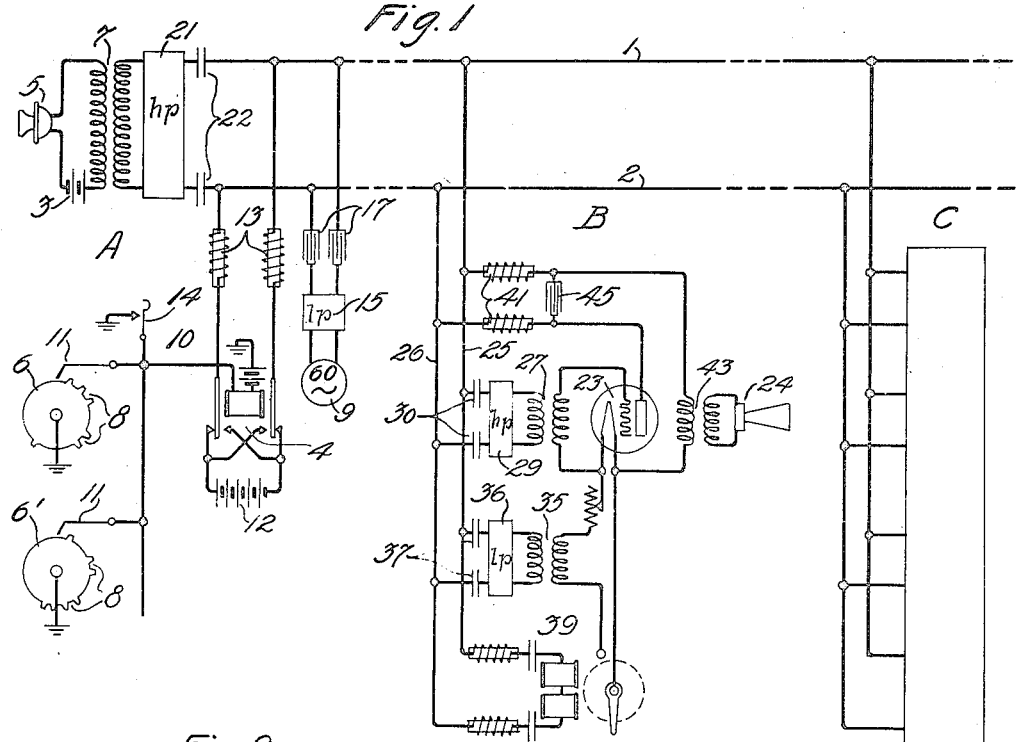

Patented May 29, 1923.

1,456,520

UNITED STATES PATENT OFFICE.

HERBERT E. SHREEVE, OF WYOMING, NEW JERSEY, ASSIGNOR TO WESTERN ELECTRIC COMPANY, INCORPORATED, OF NEW YORK, N. Y., A CORPORATION OF NEW YORK.

ENERGIZATION AND CONTROL OF VACUUM TUBES.

Application filed May 28, 1921. Serial No. 473,482.

*To all whom it may concern:*

Be it known that I, HERBERT E. SHREEVE, a citizen of the United States of America, residing at Wyoming, in the county of Essex, State of New Jersey, have invented certain new and useful Improvements in Energization and Control of Vacuum Tubes, of which the following is a full, clear, concise, and exact description.

This invention relates to the control and energization of vacuum tube amplifiers and aims to economically effect such control and energization from a distance.

Any or all of the quantities (*a*) input electro-motive force for the tubes, (*b*) plate current, and (*c*) filament current, may be supplied from a point remote from the tubes over a wire system being simultaneously used for intelligence communication purposes; and the amplifiers may if desired be selectively rendered operative and inoperative by means of impulse selectors or the like controlled over the same wire system.

The invention is especially useful in selective signaling systems such, for instance, as train despatching systems employing loud speakers at various stations along the right of way, and is disclosed hereinafter with particular reference to such systems. However, the invention obviously may be employed in connection with other systems where distant control or energization of vacuum tubes is desirable, without departing from the spirit of the invention or the scope of the appended claims.

With a large number of stations distributed over a long railway line, to supply batteries at the stations for energizing the amplifiers would be unduly expensive, especially since there are ordinarily no battery charging plants at the stations. According to this invention the undue expense is obviated by supplying energy to a number of such tubes from a distance, and using the signaling wires along the right of way to transmit this energy. Further, in accordance with the invention the operation of the tubes is controlled from a distance, by selectively controlling the filament current of the tubes for instance, and the signaling wires along the right of way are employed for effecting this control.

The invention will be better understood by reference to the accompanying drawings wherein Fig. 1 shows diagrammatically a system in which plate current and filament current are supplied to amplifiers from a distant point over a two-wire circuit, the circuit being also used to control the amplifiers from a distance and also to transmit talking current from a distance to either the input electrodes of the amplifiers, or the receiving devices, or to both; Fig. 2 shows a system in which a simplex line circuit is used for transmitting the plate current and the talking current to amplifiers from a distant point and for controlling the filament circuits from a distance; Fig. 3 shows a system in which a phantom line circuit is used for supplying amplifiers with plate, filament and talking currents from a distant point and for controlling the filament circuits from a distance; Fig. 4 shows a system in which a composited line circuit is used for supplying amplifiers with plate and talking currents from a distant point and for controlling the filament circuits from a distance; and Fig. 5 shows a system in which direct current for heating the filament of amplifiers is supplied over a two-wire circuit which also transmits talking current to the amplifiers.

In Fig. 1 a two-wire circuit 1—2 may be used as a two-way circuit for train depaching. A is a despatching station at one end of the line and B and C are way stations distant from each other and from station A. At station A is a battery 3 and transmitter 5 for supplying talking current through transformer 7 to line circuit 1—2. Also at station A is a source of current 9 for supplying 60 cycle current to the line circuit 1—2. An impulse transmitter device 10 at station A supplies the line circuit 1—2 with current having a frequency of 3½ cycles, for instance. This impulse transmitter device may be for instance, of the type disclosed in United States Patent to J. C. Field, 1,343,256, June 15, 1920, entitled "Selectively operating circuit controlling device." The transmitter 10 comprises the battery 12 for supplying current to the line circuit 1—2, the pole changing relay 4 for reversing the connections from the battery 12 to the line wires, and impulse transmitters such as are indicated at 6 and 6'. The impulse transmitters 6 and 6' are provided with teeth 8 cooperating with stationary contact springs 11 in circuit with the actuating coil of the pole-changing relay 4, and are rotatable at will to cause the teeth to intermittently close and open the circuit of the relay coil and thereby send out current reversals from the battery 12. The battery 12 is normally connected to lines 1—2, as shown. Choke coils 13 prevent the passage of alternating current from transmitter 5 or source 9 to battery 12. A low pass filter 15 prevents the flow of voice current from transmitter 5 through source 9, and condenser 17 prevents the direct current of battery 12 from passing to the filter 15 and source 9. A high pass filter 21 prevents 60 cycle current of source 9 from passing through the transformer 7, and condenser 22 prevents the direct current of battery 12 from reaching the filter 21 and transformer 7.

At station B is a vacuum tube amplifier 23 feeding a loud speaker 24. The input electrodes of the vacuum tube receive voice current from line circuit 1—2 through lines 25 and 26 and input transformer 27. A high pass filter 29 prevents the flow of 60 cycle current from source 9 to transformer 27, and condensers 30 prevent the flow of direct current from battery 12 to filter 29 and transformer 27.

The plate circuit of the amplifier 23 is supplied with direct current from source 12 over line circuit 1—2 through choke coils 41 which exclude from the plate circuit the alternating currents of sources 5 and 9. The plate circuit includes the primary winding of the output transformer 43, the secondary winding of the transformer being in circuit with the loud speaker 24. A condenser 45 permits plate current pulsations to pass therethrough without traversing the choke coils 41.

The heating current for the filament of tube 23 is supplied from source 9 over the line circuit 1—2 and the lines 25 and 26 through a transformer 35. A low pass filter 36 prevents the passage of voice current through transformer 35, and condensers 37 prevent the direct current of source 12 from reaching the filter 36 and transformer 35. The closing of the filament circuit for the tube 23 is controlled by an impulse selector 39 which receives impulses sent over the line circuit 1—2 by the selector sender 10. The impulse selector 39 may be, for instance, of the type disclosed in the Field patent mentioned above. When the filament circuit has been closed by rotating an impulse sender such as 6 or 6′ the circuit remains closed until key 14 has been closed to send a releasing impulse over the lines 1—2 to the selector.

Station C is similar to station B, and therefore, will not be described in detail.

It will be apparent that in the system of Fig. 1, the use of plate circuit batteries at stations such as, B and C for amplifiers such as 23 at those stations is avoided, these amplifiers receiving their plate current from battery 12 over lines 1—2 through choke coils such as 41. The battery 12 will have a voltage suitable for the amplifier plate circuits, for instance about 200 volts. The battery 12 of the selector transmitter device 10 thus serves also as the plate circuit battery for the tubes. It is also apparent that the use of filament heating batteries at the way stations is avoided, the heating current being supplied from station A over the line circuit 1—2.

In Fig. 2 the line circuit 51 and 52 has a despatching station $A_1$, at one end and way stations $B_1$ and $C_1$ distant from each other and from station $A_1$. Battery 3 and transmitter 5 at station $A_1$ supply voice current to the two-wire circuit 51—52 through a transformer 55. A battery 56 supplies direct current to the line circuit 51—52 through choke coils 57 which prevent voice current from passing through the battery. At station $B_1$ a loud speaker 24 is fed from the secondary winding of the output transformer 43, the primary winding of which is in the plate circuit of a vacuum tube amplifier 23. The input electrodes of the amplifier receive voice current from transmitter 5 through the line circuit 51—52, lines 65 and 66, condensers 67 and input transformer 27. The condensers 67 keep direct current from transformer 27. The plate circuit current for amplifier 23 is supplied from battery 56 through the line circuit 51—52, lines 65 and 66 and choke coils 71. The choke coils 71 prevent alternating current in the line circuit 51—52 from passing through the plate circuit and condenser 45 permits pulsations of plate current to pass therethrough without traversing the choke coils 71. Heating current for the filament is supplied by battery 75 at station $B_1$. The filament heating circuit is controlled by a selector 77 which may be, for instance, of the type referred to above. This selector is controlled by the selector sender 79 at station $A_1$, the selector sender also, preferably being of the type mentioned above. In order to provide a circuit between selector sender device 79 and selector 77, the line circuit 51—52 is simplexed by means of a ground lead 81 to the mid-point of the secondary winding of the transformer 55 and a ground lead 83 to the mid-point of the impedance 85, the selector sender being included in the lead 81 and the selector 77 being included in the lead 83. Condensers 87 prevent the flow of direct current through the secondary winding of the transformer 55, and condensers 89 prevent the flow of direct current through impedance 85.

Station $C_1$ is similar to station $B_1$ and therefore is not described in detail.

It will be apparent that the system of Fig. 2 avoids the use of local batteries in the plate circuits of the amplifiers at the way stations, the direct current for the plate circuits being supplied from battery 56 at station $A_1$ over the two-wire line circuit 51—52. In this system the two-wire line 51—52 transmits the voice current and the amplifier plate circuit current, and in connection with the ground path between selector sender device 79 and selector 77, forms a simplex line circuit over which a selector operating current is transmitted. The battery 88 of the selector transmitter device 79 need not be of the same voltage as the plate circuit battery 56.

The system of Fig. 3 comprises a phantom line circuit including the two-wire side circuit 90—91 and the two-wire side circuit 93—94. There is a despatching station $A_2$ at one end of the line circuit 90—91 and way stations $B_2$ and $C_2$ are located along the line 90—91 and spaced a considerable distance from each other and from station $A^2$. At station $A^2$ battery 95 and source 96 in series with each other supply direct current and alternating current respectively to the phantom circuit comprising the two wire line 90—91 and the two-wire line 93—94. The double throw switch 97 at station $A_2$ can be thrown to connect either the sources 95 and 96 or a selector sender device 99 as a source in the phantom circuit. The selector sender device 99 is preferably of the type disclosed in the patent mentioned above. At station $B_2$ a loud speaker 24 is fed from a vacuum tube amplifier 23 through transformer 43. Direct current for the plate circuit of tube 23 flows from battery 95 through source 96, switch 97, lead 101, through the secondary of the speech current transformer 103, lines 90—91, the impedance coil 105, lead 107, choke coil 108, primary winding of transformer 43, tube 23, lead 109, choke coil 110, lead 111, impedance 112, lines 93—94, impedance 113, lead 114 and switch 97 back to battery 95. Choke coils 108 and 110 prevent the 60 cycle current of source 96 from passing between the anode and cathode in the tube. Condenser 45 permits pulsations of plate current to pass therethrough without transversing choke coils 108 and 110. The input electrodes of tube 23 are fed from the secondary of transformer 27, the primary of which receives voice current from transmitter 5 over lines 90—91. Heating current for the filament of tube 23 is supplied from the secondary winding of transformer 35, the primary winding of which is supplied with 60 cycle current over the following circuit; from source 96, through switch 97, lead 101, the secondary winding of transformer 103, leads 90—91, impedance 105, lead 107, condenser 117, contact of selector 119, primary winding of transformer 35, lead 111, impedance 112, lines 93—94, impedance 113, lead 114, switch 97 and battery 95 back to source 96.

The condenser 117 keeps direct current from source 95 out of the primary winding of transformer 35. The selector 119 is preferably of the type disclosed in the patent mentioned above. The impulses from selector sender device 99 for controlling selector 119 pass from the selector sender device 99 through switch 97, lead 101, secondary winding of transformer 103, lines 90—91, impedance 105, lead 121, selector 119, lead 123, impedance 112, lines 93—94, impedance 113, lead 114, and switch 97 back to selector sender device 99. In this system the battery 125 of the selector transmitter device 99 need not be of the same voltage as the plate circuit battery 95.

Station $C_2$ is similar to station $B_2$ and therefore is not described in detail.

Fig. 4 shows a system comprising a composited line circuit for transmitting voice currents from transmitter 5 at a despatching station $A_3$ over the two-wire line 131—132 to the input transformer 27 of a vacuum tube 23 at a waystation $C_3$ and for transmitting direct current from battery 133 over line 131 to the plate circuit of the tube and for transmitting impulses from the selector sender device 135 over the line 132 to selector 137. The return paths for the direct current and the impulses are through ground. The selector and the selector sender device are preferably of the type referred to above. Condensers 139 keep direct current out of the secondary winding of transformer 7, and condensers 141 keep direct current out of the primary winding of transformer 27. Choke coils 143 prevent the voice current from flowing to and through the ground. The direct current for the plate circuit of tube 23 flows from battery 133, through choke coil 143, line 131, coil 147, lead 144, tube 23, lead 145, primary winding of the output transformer 43, lead 146 and ground to battery 133. Condenser 149 permits pulsations of plate current to pass therethrough without traversing the choke coil 147.

In Fig. 5 a two-wire line circuit 151—152 transmits voice current from transmitter 5 at one end of the circuit to the input transformers 153, 154 and 155 of vacuum tubes 156, 157 and 158 respectively which may be distant from each other and from transmitter 5, and at the same time transmits direct current from battery 161 to the filaments of the tubes, all of the filaments being connected in series in order to avoid as far as possible the transmission of large current at low voltage. The amplifiers 156, 157 and 158 supply current to the loud speakers 163, 165 and 167 respectively. Direct current for the plate circuits of the amplifiers 156, 157 and 158 is supplied by local batteries 169, 171 and 173 to their respective amplifiers. Condensers 175, 176 and 177 prevent direct current of battery 161 from passing through the primary windings of transformers 153, 154, 155 respectively. Choke coil 179 prevents voice current from passing through the battery 161. Condenser 181 prevents the direct current of battery 161 from passing through the secondary winding of transformer 183 which connects transmitter 5 with lines 151 and 152. Choke coils 185, 186 and 187 keep voice currents out of the filaments of tubes 156, 157 and 158 respectively; condenser 188 by-passing voice current around choke coil 185 and the filament of tube 156, and condenser 189 by-passing voice current around choke coil 186 and the filament of tube 157.

It will be observed that in transmitting over the same wire system two or more currents, such as intelligence communication currents, energizing currents for the operation of vacuum tube amplifiers, and impulse currents for selecting the amplifier stations a plurality of these currents may each be transmitted over substantially the whole of the same wire system, as for instance in Figs. 1, 2 and 5, or only part of the same wire system may be common conductors for the plurality of currents, as for instance, in Figs. 3 and 4. Moreover, it will be obvious from these illustrations of typical applications of the invention that various other applications may be made involving the principles of the invention and falling within the scope of the appended claims.

The expression "currents of different frequencies", as appearing in the claims, is intended to be generic to the case of an alternating current and a direct current, the direct current being regarded as a current of zero frequency.

What is claimed is:

1. A system comprising an electron discharge amplifying tube, said tube having circuit paths therein, and means for supplying current of different frequencies to said circuit paths, said means comprising sources of electromotive force of said different frequencies remote from said tube, lines connecting the vacuum tube with said sources of electromotive force, and circuit means providing paths for said currents selective as between said currents of different frequencies.

2. A system comprising on electron discharge amplifying tube having therein a plate circuit and an input circuit, a source of direct current, a source of current waves, of direct current, a source of current waves, said sources being remote from said tube, a line for connecting said sources to said circuits, means for preventing the flow of direct current from said line to said input circuit, and means for preventing the flow of current waves from said line to said plate circuit.

3. A system comprising a plurality of electron discharge amplifying tubes each having a cathode and a cathode-heating circuit, an intelligence transmission line, a source of electromotive force waves for supplying intelligence transmitting currents to said line, and means comprising said line for selectively controlling said heating circuits from a point remote from said tubes.

4. A system comprising a plurality of electron discharge amplifying tubes each having a cathode and having an input circuit and a cathode-heating circuit, a source distant from one of said tubes, a transmission line for connecting said source to said input circuits, and means comprising said line for selectively controlling said cathode-heating circuits from a point distant from said one tube.

5. A system comprising an electron discharge amplifying tube having a plate circuit, an input circuit and a cathode-heating circuit, a source remote from said tube for supplying current waves for said input circuit, a source remote from said tube for supplying direct current for said plate circuit, means at said tube for controlling said heating circuit, means remote from said tube whereby said first-mentioned means may be controlled, and a simplex line circuit for connecting said source of current waves to said input circuit and for connecting said direct current source to said plate circuit and for connecting said second-mentioned means to said first-mentioned means.

6. A system comprising an electron discharge amplifying tube, common conductors for supplying, from a distance, direct current to the plate circuit of said tube and electrical variations to the control electrode of said tube, and means for preventing said electrical variations from reaching the plate electrode of said tube.

7. A system comprising an electron discharge tube having a plate circuit, an input circuit and a cathode heating circuit, a source remote from said tube for supplying current waves for said input circuit, a source remote from said tube for supplying direct current for said plate circuit, common conductors for transmitting said waves and said direct current from said sources to said tube, means at said tube for controlling said heating circuit, and means remote from said tube for controlling said first mentioned means over said conductors in parallel.

8. A system comprising an electron discharge amplifying tube having a plate circuit and an input circuit, a source remote from said tube for supplying current waves for said input circuit, a source remote from said tube for supplying direct current for said plate circuit, means at said tube whereby said tube may be rendered operative and inoperative, and a simplex line circuit for connecting said source of current waves to said input circuit and for connecting said direct current source to said plate circuit and for connecting said second mentioned means to said first mentioned means.

9. A system comprising a plurality of electron discharge amplifying tubes, an intelligence transmission line, a source of electromotive force waves for supplying intelligence transmitting currents to said line, and means comprising said line whereby said tubes can be selectively rendered operative and inoperative from a point remote from said tubes.

In witness whereof, I hereunto subscribe my name this 23rd day of May, A. D., 1921.

HERBERT E. SHREEVE.